United States Patent [19]
Hobbs et al.

[11] 3,979,192
[45] Sept. 7, 1976

[54] CONTROL OF FOAM GENERATION IN GAS-LIQUID SEPARATION TOWERS

[75] Inventors: Stanley Y. Hobbs, Scotia; Charles F. Pratt, Schenectady, both of N.Y.

[73] Assignee: General Electric Company, Schenectady, N.Y.

[22] Filed: Nov. 20, 1974

[21] Appl. No.: 525,289

[52] U.S. Cl. .......... 55/87; 55/95; 55/178; 159/DIG. 4; 137/170.1; 202/264

[51] Int. Cl.$^2$ .......... B01D 47/12

[58] Field of Search .......... 55/39, 87, 95, 178, 55/262, 244, 248, 257; 252/361; 73/60.1; 137/12.5, 170.1; 202/264; 159/DIG. 4; 23/288 E

[56] References Cited
UNITED STATES PATENTS

| | | | |
|---|---|---|---|
| 2,169,369 | 8/1939 | Osterloh et al. | 55/87 X |
| 2,373,951 | 4/1945 | Evans et al. | 55/87 |
| 2,500,008 | 3/1950 | Richardson | 23/288 E |
| 2,926,754 | 3/1960 | Ragatz | 55/87 X |
| 3,585,150 | 6/1971 | Gustafson et al. | 55/87 X |
| 3,600,454 | 8/1971 | Jhawar | 55/87 X |

FOREIGN PATENTS OR APPLICATIONS

| | | |
|---|---|---|
| 1,091,199 | 11/1967 | United Kingdom |

*Primary Examiner*—Frank W. Lutter
*Assistant Examiner*—David L. Lacey
*Attorney, Agent, or Firm*—Charles T. Watts; Joseph T. Cohen; Jerome C. Squillaro

[57] ABSTRACT

An antifoam composition is introduced as an aerosol into the main gas stream entering a gas-liquid separation tower. The main gas stream carries the small aerosol particles up the tower through the sieve-like separation trays and the water moving over the plurality of trays. The movement of the antifoam carried in the gas stream to the top of the tower is many times more rapid than the transit of liquid down the tower in countercurrent movement thereto. For antifoam particle sizes in the preferred range, movement of the antifoam continues unabated through a long series of trays in the tower to effectively inhibit foam formation therein.

6 Claims, 1 Drawing Figure

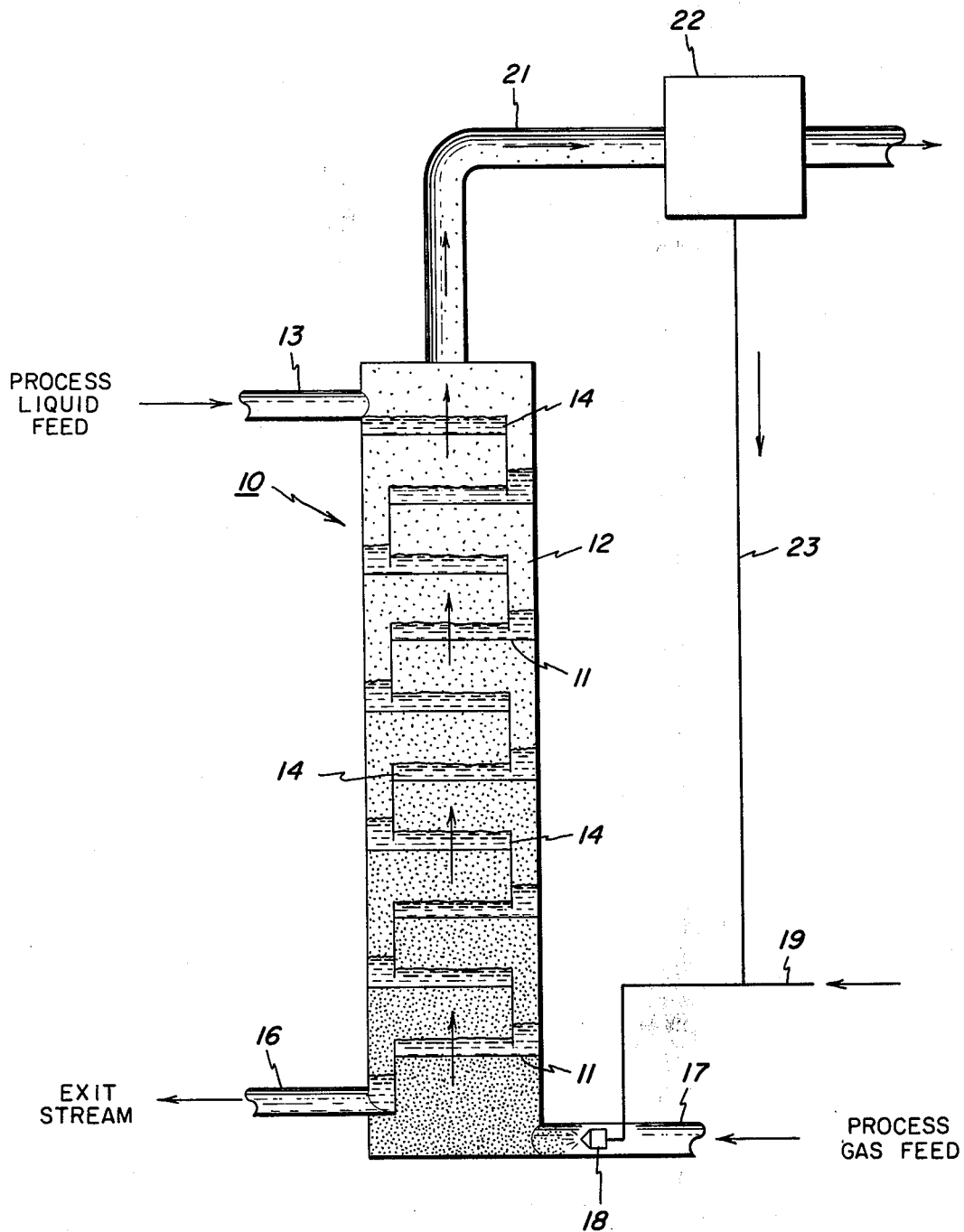

CONTROL OF FOAM GENERATION IN GAS-LIQUID SEPARATION TOWERS

BACKGROUND OF THE INVENTION

It is known that foaming in the process liquid in a (gas-liquid separation) tower will substantially reduce the throughput capability thereof. Such foaming may result from the combined presence of a surface active process additive (or impurity) in the process liquid feed and the bubbling action of the process gas feed as it passes upwardly through the liquid moving over any of the plurality of separation (sieve) trays.

A method of foam inhibition in a static aqueous system is described in British Pat. No. 1,091,199. Therein, an antifoam composition reduced to a finely-divided state in a venturi is dispersed in a gas stream and this stream of gas containing the antifoam dispersion is continuously, or intermittently, introduced into a static aqueous medium. The British Patent teaches that the size of the droplets of antifoam composition is not critical provided they are sufficiently small to be carried into (i.e. they are not lost in transit) the foaming medium by the flow of gas. Without the exercise of control over the particle distribution size the range of particle size will typically extend from sub-micron size to 100 microns or more.

The problem faced in the control of foaming in industrial gas-liquid separation processes is unique in that the antifoaming composition may have to be delivered to trays hundreds of feet from the available sites for introduction of the antifoam composition to the separation tower.

In the conduct of studies attempting to solve the foaming problem in such gas-liquid separation towers, it has been determined that most antifoam agents lose their effectiveness after a fatigue time, which is usually of the order of 15–20 minutes or less. Since, in a separation tower about 300 feet high, the transit time for the process liquid is approximately one-half hour, an antifoam introduced into the process feed stream entering the top of the tower does not effectively reduce foaming on the lower trays. Moreover, since the transit time is long, it is not feasible to add the antifoam on an intermittent basis in response to foaming upsets. The consequent need for continued addition is economically unfavorable.

It would be particularly advantageous to be able to eliminate the need for continuous addition of antifoam composition.

DESCRIPTION OF THE INVENTION

The solution to this problem has become possible by the discovery that small aerosol particles of antifoam composition are easily carried up a separation tower by the process gas stream still being able to survive and function after sequential transit through a large number of sieve trays and the process liquid moving thereover.

It has been found that, because the mass transfer rate of the process gas stream, which transports the antifoam, is much faster than the relatively slow moving process liquid stream, the antifoam can reach any trouble site (tray) very quickly. For this reason, this invention removes the need for continuous addition of antifoam composition. Short spurts of antifoam aerosol into the continuously moving process gas stream is all that is required and substantial cost savings can be realized over the alternate method, continuous addition.

Further, excess antifoam can be recovered from the process gas stream leaving the separation tower for return to the input station.

Although any antifoam composition (liquid or solid) may be employed according to the process of this invention provided it can be converted to a finely-divided state for dispersion in the process gas, it is preferred that the size of the particles be in the 1 to 20 micron range, with the optimum size (mass mean diameter) being about 5 microns. The preferred antifoam compositions are those based on the silicones to which fumed silica has been added, but all antifoam compositions may be used. An example of a suitable silicone fluid is SF96 (General Electric) having an absolute viscosity of about 100 centistokes (cs). One example of a suitable antifoam composition is AF66 (General Electric). Liquid antifoams employed should have absolute viscosities in the 5–1000 cs range.

BRIEF DESCRIPTION OF THE DRAWING

The exact nature of this invention as well as objects and advantages thereof will be readily apparent from consideration of the following specification relating to the annexed drawing in which is schematically set forth a gas-liquid separation tower to which the instant invention has been applied.

MANNER AND PROCESS OF MAKING AND USING THE INVENTION

As is shown in the drawing the sieve tray tower 10 contains a plurality of conventional separation trays 11 interconnected by downcomers 12. The process liquid feed is provided via conduit 13 at the top of tower 10 and enters on to the uppermost tray. The amount of the moving liquid temporarily accumulating on any of the trays is determined by the height of each weir 14. Trays 11 are perforated to permit the passage therethrough of upwardly moving process gas, and the combination of relatively small perforations and the positive gas pressure prevent downward drainage of the liquid. As process liquid continues to enter the tower, liquid is displaced from each tray 11, passes over weir 14 and moves to the next lower tray in sequence until the exit conduit 16 is reached whereupon the treated liquid leaves the tower.

The process gas feed enters the tower via conduit 17. Antifoam feed is supplied to aerosol spray nozzle 18 via conduit 19. The process gas feed containing particles of aerosol is brought into contact with the lowermost tray 11. The process gas with the entrained aerosol particles passes through the sieve openings and through the slowmoving liquid on the tray on its way up the tower. This process is repeated at each tray encountered in the upward movement with a small fraction of the aerosol particles being transferred to each liquid layer until the process gas feed containing aerosol antifoam particles has passed through the upermost tray and slow-moving liquid thereon to exit from tower 10 via conduit 21. Aerosol separation equipment 22 (e.g. jet impactor, vane-type mist extractors) removes the remaining antifoam particles from the gas stream and returns these particles to the antifoam feed via conduit 23.

Since the liquid is slowly moving through the tower, any given portion of liquid receives multiple contact with the upwardly moving process gas in order to achieve the desired gas-liquid contact in conducting the given industrial process.

Experiments were performed in three different types of apparatus:
1. A 3½ inch I.D. Pyrex glass tube about 2 feet high seated at the bottom in a comparably sized Buchner funnel by means of an O-ring;
2. a laboratory-scale four-plate model sieve tray tower (11 cm × 11 cm cross section) and
3. a pilot plant-scale four-plate model sieve tray tower made of Plexiglass in which the tray spacing was 18 inches.

In all tests sodium lauryl sulfate was used as the surfactant, AF-66 was used as the antifoam and nitrogen gas was used as the dispersant for the aerosol.

The aerosol antifoams proved to be effective in all experiments. Foam levels were reduced very quickly and dramatically, usually to less than half of their original height. Foam bubble size tended to increase, possibly through agglomeration. In the apparatus with multiple trays, foam was destroyed on the lowest tray first, and the effect spread successively to the upper trays indicating that the silicone oil was carried up the column with the process gas and was not collected in and transported by the liquid stream. This observation was confirmed in tests run in the pilot plant-scale tower in which the silicone content of the water was checked before and after the introduction of antifoam and it was found that the silicone content did not change appreciably during the testing.

Initial experiments were carried out in apparatus 1. The glass tube was charged with about 500 milliters of 10 ppm sodium laryul sulfate solution. Nitrogen was bubbled through at the rate of 90 SCFH. Foam stabilized to a height of about 35–40 cm in the column (original liquid height was 8 cm). Upon the introduction of aerosol antifoam into the nitrogen stream (approximately 1 ml of AF-66), foam height dropped to 10–15 cm (2–7 cm above the original liquid head). Even low ppm levels (1 ppm or less based on the antifoam/gas mass ratios) of antifoam kept such foams depressed for 5–10 minutes in other tests. Most of the aerosol apparently passed through the solution with the gas phase. The foam height gradually rebounded, but did not reach its original height. Successive short bursts of aerosol antifoam always caused a drop in the foam height. In the laboratory scale sieve tray tower, foam generally filled the spaces between trays, which corresponded to a height of 8 cm. The top tray often had 10–15 cm foam heights. The foaming was again then reduced dramatically upon the introduction of about 1 ml of AF-66 atomized antifoam. Foam heights dropped to 0–2 cm and it was found that the foam was killed not only on the lowest tray but also on all of the successive trays.

The most significant tests were run in the pilot plant-scale separation tower. Tests were run at 5% open tray area utilizing air as the process gas at a flow of 850 SCFM. The cross-sectional dimensions of each of the four trays was 18 inches × 24 inches, the weir height was 2 inches and each tray had a 9 inch × 18 inch downcomer. A 35 ppm solution of sodium lauryl sulfate was circulated through the tower at 54gal/min (gpm) and the process air was blown countercurrently up the tower.

The spray head used was of the industrial gas-atomizing type (Spray Engineering Company No. 2277) was used to generate the aerosol antifoams. It was found that by directing the spray head downward facing the upcoming air, less of the silicone oil collected on the walls of the tower. The antifoam was metered into the spray head by the use of a gear pump (Zenith ¼ pump) which allowed rates as low as 2 ml/min of the silicone oil.

With the addition of about 12 ml of the AF-66 antifoam at a rate of 4–5 ml/min, foam heights dropped markedly, after approximately a 2–3 minute lag time not encountered earlier. Part of this delay reflects the fact that the foam height dropped more slowly with time and the 2–3 minutes represents the time required to reach a "minimum" foam height. Some reduction was observed almost immediately after addition. On each tray average foam levels were reduced to about two-thirds of the original value (e.g. 13 to 8.5 inches) and downcomer foam heights dropped about one-half (e.g. 33 to 18 inches). The data are shown in Table 1 below.

TABLE 1*

| | before antifoam addition | after antifoam addition |
|---|---|---|
| Tray 1 foam height (in.) | 9.5 | 7.5 |
| Tray 2 foam height (in.) | 14.0 | 8.0 |
| Tray 3 foam height (in.) | 16.0 | 11.0 |
| Downcomer 1 foam height (in.) | 32.0 | 18.0 |
| Downcomer 2 foam height (in.) | 33.0 | 28.0 |
| Downcomer 3 foam height (in.) | 33.0 | 9.0 |
| Collection tray (ml/min of solution) | 52.0 | 0.8 |
| Silicone content of water (ppm) | $\lesssim 5.0$ | $\lesssim 5.0$ |

*F factor ($\rho v^2$) = 1.4 in all tests

A collection tray (not shown) located at the top of the tower in order to determine the effect of the antifoam on process efficiency was collecting 52 ml/min of solution before the antifoam was introduced and 0.8 ml/min of solution after the test. The volumes measured on the collection tray represent water being carried the "wrong way" due to entrainment of foam in the gas stream and are a measure of process inefficiency.

As in the laboratory-scale tower experiments, foam was destroyed on the lowest tray first and the effects spread successively to each of the upper trays. This again indicates that the silicone oil was carried up the column with the air (process gas) and was not collected in or transported by the liquid stream. Foam heights started to rebound 3–5 minutes after the introduction of antifoam aerosol was stopped and reached about 90% of their original height after 10 minutes. This slower rebounding (as compared to the small scale tests) probably lies in the fact that the mass transfer efficiency of a larger, taller tower is so much better. Moreover, in any full-scale tower it can be expected that the velocity of transition of the antifoam composition up the tower will be approximately equal to the process gas velocity up through the tower.

BEST MODE CONTEMPLATED

Although specific plant constraints may require modifying the system disclosed to achieve optimum operation for that plant, in general the best mode has been disclosed above as to operation (i.e. method of introduction of antifoam composition, particle size etc.). However, in order to achieve best results the means (e.g. nozzle, venturi, atomizer, etc.) employed to reduce the antifoam composition to the finely-divided state for dispersing the droplets should first be characterized as to its particulate size output (e.g. in a cascade impactor) under the operating conditions to be employed in the tower. The droplet size spread can be altered by 1) changing the liquid antifoam/gas flow rate, 2) changing the operating gas pressure and/or 3) changing the geometry of the dispersing means.

Also, maintenance problems are eased, better control is obtained over droplet size distribution and facilitation of collection and recycling of excessively sized droplets is achieved by locating the dispersing means in an external aerosol generation chamber (not shown) and then introducing the properly-sized aerosol into the process stream under slightly positive gas pressure.

What we claim as new and desire to secure by Letters Patent of the United States is:

1. In the process of contacting a liquid with a pressurized gas wherein the liquid is introduced into the upper region of a separation tray tower having a plurality of sieve trays and a plurality of interconnecting downcomers, the pressurized gas being admitted in the lower region of said tower in countercurrent flow with the liquid, the improvement comprising the steps of intermittently dispersing a finely-divided antifoam composition into the pressurized gas at a location below the sieve trays such that the antifoam continues unabated through the plurality of trays in the tower to effectively inhibit foam formation therein.

2. The improvement of claim 1 wherein the size of the particles is in the 1–20 micron range with the mass mean diameter being about 5 microns.

3. The improvement of claim 1 wherein antifoam particles are recovered from the gas stream leaving the tower and recycled.

4. In a separation tray tower having a plurality of vertically spaced sieve trays disposed therein interconnected by downcomers whereby liquid passes downward in sequence from tray to tray via the interconnecting downcomers for discharge from said tower at the lower end thereof while pressurized process gas is admitted through an inlet conduit at said lower end for upward flow counter to the liquid flow, the improvement comprising means for dispensing finely-divided antifoam composition into the pressurized gas, said dispensing means being mounted in the process gas inlet conduit to deliver the said antifoam composition into the pressurized gas in the said inlet conduit.

5. The improvement of claim 4 wherein the height of the tower is of the order of 300 feet.

6. The improvement of claim 4 wherein the dispensing means within the inlet conduit includes an aerosol spray nozzle.

* * * * *